No. 861,737. PATENTED JULY 30, 1907.
I. P. B. KNUDSEN.
BEARING FOR RAPIDLY ROTATING BODIES.
APPLICATION FILED JAN. 2, 1907.

Witnesses
J. H. Simms
A. Knight

Inventor
Ivar Peter Bagger Knudsen
by
Emil Bönnelycke
Atty.

UNITED STATES PATENT OFFICE.

IVAR PETER BAGGER KNUDSEN, OF COPENHAGEN, DENMARK.

BEARING FOR RAPIDLY-ROTATING BODIES.

No. 861,737.

Specification of Letters Patent.

Patented July 30, 1907.

Application filed January 2, 1907. Serial No. 350,642.

*To all whom it may concern:*

Be it known that I, IVAR PETER BAGGER KNUDSEN, director, a subject of Denmark, residing at No. 56 Ivanemöllevej, in the city of Copenhagen and Kingdom of Denmark, have invented new and useful Improvements in Bearings for Rapidly-Rotating Bodies, of which the following is a specification.

This invention relates to a bearing for rapidly rotating bodies arranged in such manner that it will allow the body supported by it to rotate on the axis passing through the center of gravity, while at the same time it has a constant tendency to center the body during the rotation. By this means the shocks and vibration which would otherwise occur during the rotation, are diminished to a great extent or are practically eliminated, so that the running of the machine is rendered much steadier than otherwise, while its durability is considerably increased.

Figure 1:
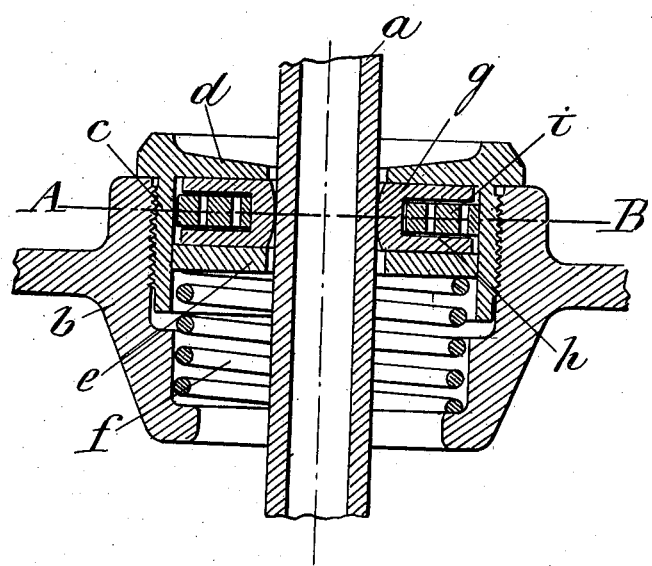
Figure 2:
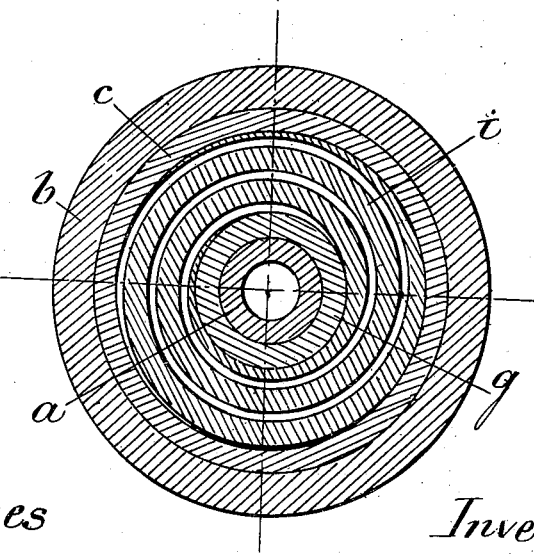

A constructional form of the invention is illustrated in the accompanying drawing in which Figure 1 is a vertical central section through the bearing, and Fig. 2 is a horizontal section on line A—B of Fig. 1.

The pivot member of the rapidly rotating body is indicated by $a$, while $b$ indicates the casing provided for the bearing in the framing of the machine. In this casing there is screwed a box $c$ having at its upper end an annular flange $d$ which encircles the member $a$ with a suitable clearance space between the two.

An annular disk $g$ of suitable material is arranged between the flange $d$ and an annular plate $e$ or the like which is placed loose in the cylindrical bore of the box $c$ and which is pressed by means of one or more springs $f$ against the flange $d$. This disk $g$ encircles and supports the member $a$ and its outer diameter is somewhat smaller than the diameter of the bore of the box $c$ so that it is capable of yielding when the pressure exerted by the member is so great that it can overcome the friction between the disk and the surface between which it is firmly clamped.

A spiral spring $i$ is arranged in an annular recess $h$ provided in the outer surface of the disk $g$. This spiral spring $i$ bears against the inner wall of the box $c$ and has a constant tendency to center the disk $g$ and, along with the latter, the member $a$.

The above described arrangement has for effect to render the running of the body steady and even, in consequence of the fact that all shocks and vibrations are taken up by the disk $g$ which is clamped fast between the two surfaces. This disk, while overcoming the frictional resistance between it and the surface, yields to the pressure of the member $a$ without producing sudden reactional strains, because the member must always again overcome the aforesaid frictional resistance; at the same time the spring $i$ has a tendency to return the pivot member into the normal or central position.

The construction shown may obviously be modified without departing from the principle of the invention.

Having now described and ascertained the nature of my said invention and in what manner the same is to be performed I declare that what I claim is:

1. In a bearing for a rapidly rotating body, the combination with the pivot member of the body, of a disk encircling the pivot member and displaceable therewith in a direction transversely of the axis of the bearing, a spring tending to maintain the disk and pivot member in a central position, and members having surfaces between which said disk is clamped in such a manner as to cause frictional resistance to be offered to movements of the disk transversely of the axis of the bearing, substantially as described.

2. In a bearing for a rapidly rotating body, the combination with the pivot member of the body, of a disk arranged to move with the pivot member transversely of the normal axis of the pivot member, a pair of members having surfaces between which the disk is clamped in such a manner as to cause frictional resistance to be offered to the transverse movement of the disk and the pivot member, and yielding means tending to center the disk and the pivot member.

3. In a bearing for rapidly rotating bodies, the combination with the pivot member of the body, of a disk encircling and supporting the pivot member, arranged to move against frictional resistance transversely of the axis of the pivot member and provided with an annular recess, and a spring arranged in the recess in the disk and tending to center the disk and the pivot member.

In testimony whereof I have signed my name to this specification in the presence of two subscribing witnesses.

IVAR PETER BAGGER KNUDSEN.

Witnesses:
MARCUS MÖLLER,
M. MAGNUS.